(12) United States Patent
Baumann et al.

(10) Patent No.: US 6,671,346 B2
(45) Date of Patent: Dec. 30, 2003

(54) METHOD FOR THE NONDESTRUCTIVE QUALITY TESTING OF A THERMOCOUPLE WHICH CAN BE USED IN PARTICULAR AT HIGH TEMPERATURES AND/OR UNDER HIGH LEVELS OF VIBRATION

(75) Inventors: Robert Baumann, Klingnau (CH); Michael Class, Untersiggenthal (CH)

(73) Assignee: Alstom (Switzerland) Ltd., Baden (CH)

( * ) Notice: Subject to any disclaimer, the term of this patent is extended or adjusted under 35 U.S.C. 154(b) by 34 days.

(21) Appl. No.: 10/131,127

(22) Filed: Apr. 25, 2002

(65) Prior Publication Data

US 2002/0186024 A1 Dec. 12, 2002

(30) Foreign Application Priority Data

May 9, 2001 (CH) .............................................. 0840/01

(51) Int. Cl.[7] .............................................. G01B 15/06
(52) U.S. Cl. .............................. 378/58; 378/57; 378/59
(58) Field of Search .............................. 378/51, 53, 54, 378/57, 58, 59; 374/179

(56) References Cited

U.S. PATENT DOCUMENTS

| | | | |
|---|---|---|---|
| 4,164,433 A | | 8/1979 | Granahan et al. ............ 136/229 |
| 5,012,502 A | * | 4/1991 | Battin et al. .................. 378/58 |
| 6,137,860 A | * | 10/2000 | Ellegood et al. ............... 378/58 |
| 6,377,654 B1 | * | 4/2002 | Willems et al. ............... 378/59 |

OTHER PUBLICATIONS

M.J. Roberts et al, "Derivation and Testing of a Model to Calculate Electrical Shunting and Leakage Errors in Sheathed Thermocouples", Review of Scientific Instruments., Bd. 48, Nr. 9, Sep. 1977, pp. 1179–1191, XP002176249 American Institute of Physics. New York., U.S., ISSN:0034–6748.

* cited by examiner

Primary Examiner—Edward J. Glick
Assistant Examiner—Allen C. Ho
(74) Attorney, Agent, or Firm—Adam J. Cermak

(57) ABSTRACT

In a method for the nondestructive quality testing of a thermocouple (10) which can be used in particular at high temperatures and/or under high levels of vibration, which thermocouple (10) comprises at least two wires (13, 14) which run substantially parallel to one another in one plane, are connected to one another at their ends by a welded joint (15), are surrounded by a hermetically sealed sheath (11) and inside the sheath (11) are embedded in insulation (16, 17) comprising a compacted powder, simple and reliable assessment is achieved by the fact that the X-radiation is passed through the thermocouple (10) perpendicular to the plane of the wires (13, 14) and an X-ray image is taken, that the position of the wires (13, 14) in the vicinity of the welded joint (15) is determined from the X-ray image, and that the quality of the thermocouple (10) is established from the position of the wires (13, 14) in the vicinity of the welded joint (15).

7 Claims, 3 Drawing Sheets

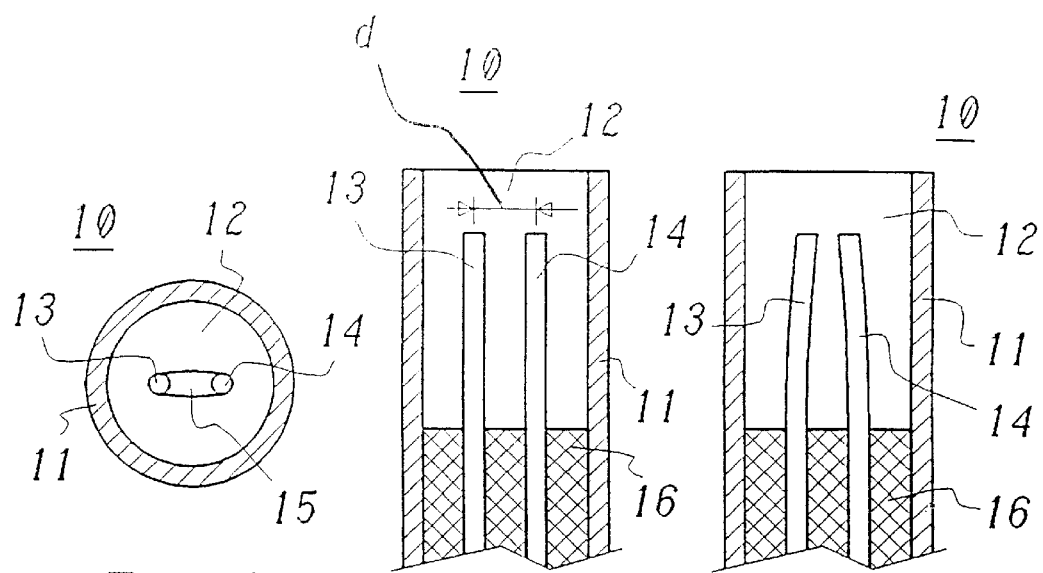
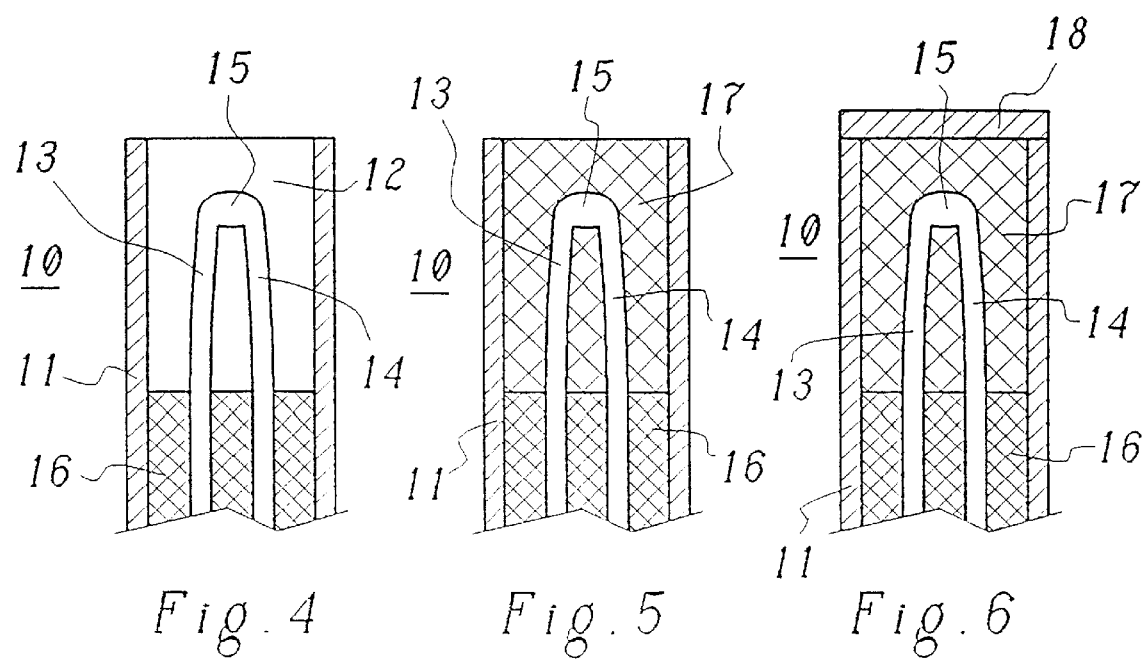

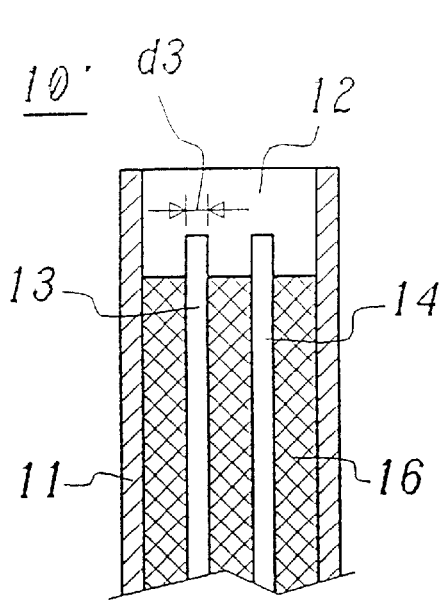
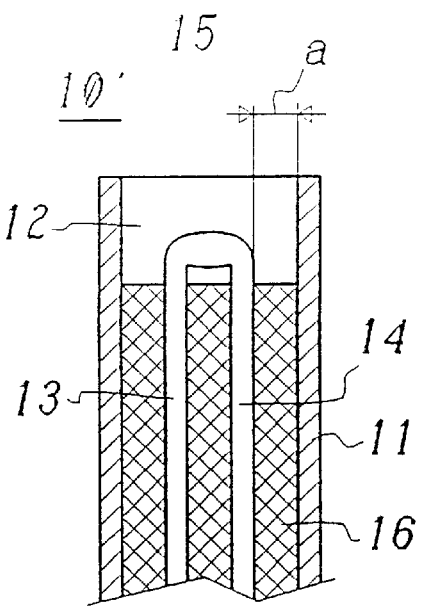
Fig. 7
Fig. 8
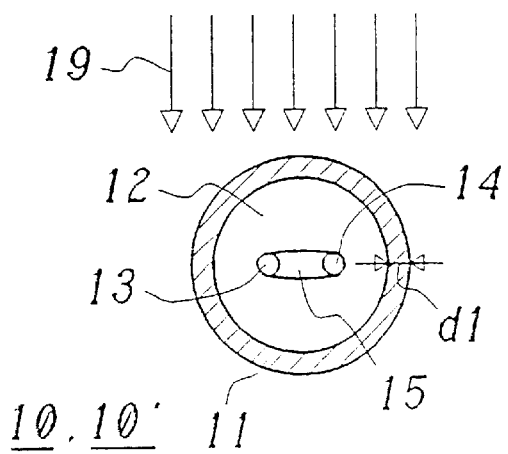
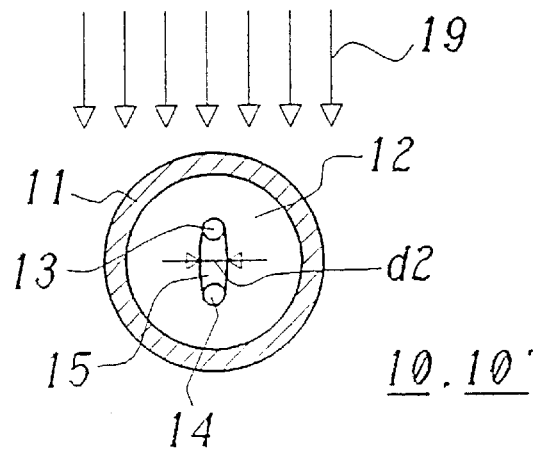
Fig. 9
Fig. 10

METHOD FOR THE NONDESTRUCTIVE QUALITY TESTING OF A THERMOCOUPLE WHICH CAN BE USED IN PARTICULAR AT HIGH TEMPERATURES AND/OR UNDER HIGH LEVELS OF VIBRATION

TECHNICAL FIELD

The present invention relates to the field of quality assurance. It relates to a method for the nondestructive quality testing of a thermocouple in accordance with the preamble of claim 1.

PRIOR ART

The hot junction, i.e. the location at which the two different wires of the thermocouple are connected or welded to one another, is the most important area of a thermocouple. Its quality has a direct influence on the expected service life in use under extreme environmental conditions, such as those which prevail, for example, when the thermocouple is used in a gas turbine. Tests carried out on previous failures have shown that fatigue fractures in the wires, induced by vibration and alternating loads, are one of the major reasons for failure of the thermocouples.

The reasons for this can be explained with reference to FIGS. 1 to 8: in a thermocouple 10 which is shown in cross section in FIG. 1, two wires 13, 14 comprising metals or metal alloys which are adapted with regard to the thermoelectric effect, run substantially parallel to one another and at their ends are connected to one another by a welded joint 15 so as to form a hot junction, are arranged inside a closed sheath 11. The interior 12 of the sheath 11 is filled with insulation, which consists, for example, of compressed MgO powder.

Thermocouples of this type can currently be produced in various ways, which are of considerable significance with regard to the subsequent service life. In the case of the production route illustrated in FIGS. 2 to 6, which in each case show the thermocouple 10 in longitudinal section, the starting point is a pair of parallel wires 13, 14 which are as yet unconnected and, inside the sheath 11, are initially completely embedded in insulation comprising highly compressed (MgO) powder. Then, the insulation 16 is removed from the wires 13, 14—for example by sand-blasting—over a relatively great length, for example over several millimeters (FIG. 2). The free ends of the wires 13, 14 are then bent toward one another, so as to deviate from the parallel orientation (FIG. 3), and are then welded to one another by a welded joint 15 (FIG. 4). The free interior space 12 is then filled again with insulation 17 comprising (MgO) powder (FIG. 5) and is finally closed off by a (welded) closure 18 (FIG. 6). For manufacturing technology reasons, the insulation 17 is less highly compressed than the insulation 16, as indicated by different hatching in FIGS. 5 and 6.

Two problems arise with this method of production and may lead to failure of the thermocouples and therefore reduce quality: firstly, when the wires are being exposed by means of sandblasting, the wires are exposed to a vibrational load which may cause some level of damage to the wires. Secondly, the mechanical support for the wires 13, 14 provided by the insulation 17 which is added at a later stage and is less highly compressed is considerably lower, and consequently during operation the wires, which may already have been preliminarily damaged, are made to vibrate and may therefore fail as a result of vibration fatigue.

In the different production route shown in FIGS. 7 and 8, only the immediate ends of the wires 13, 14 of the thermocouple 10' are exposed and welded to one another (welded joint 15). The filling and closing steps then take place in a similar manner to those illustrated in FIGS. 5 and 6. With this type of production, the wires 13, 14 are subject to considerably lower mechanical loads both during production and during subsequent operation.

To keep the risk of the thermocouple failing during subsequent operation as low as possible, thermocouples which have been produced as shown in FIGS. 2 to 6 are wherever possible detected at the incoming inspection and are separated out as being unsuitable for certain applications. It is therefore desirable to have a method which allows nondestructive testing to determine which of the two methods described above has been used to produce the thermocouples.

SUMMARY OF THE INVENTION

Therefore, it is an object of the invention to provide a method which allows simple nondestructive testing of thermocouples to determine whether they are suitable for use under extreme environmental conditions.

The core principle of the invention consists in X-radiation being passed through the thermocouple perpendicular to the plane of the wires and in taking an X-ray image, then determining the position of the wires in the vicinity of the welded joint from the X-ray image, and finally establishing the quality of the thermocouple from the position of the wires in the vicinity of the welded joint. The position of the wires provides an indirect indication as to the extent to which the wires have been exposed during production of the welded joint and where the boundary between the highly compacted insulation powder and the less compacted insulation powder which was added at a later stage is located.

In particular, the quality of the thermocouple is deemed acceptable if the wires run completely parallel as far as the welded joint, while the quality of the thermocouple is deemed unacceptable if the wires are angled off or bent toward one another, deviating from the parallel arrangement, a few millimeters before the welded joint.

If the wires are at a predetermined first distance from one another in the parallel arrangement, the quality of the thermocouple is preferably deemed unacceptable if the distance between the wires in the angled-off region is reduced by more than a third of the first distance.

It is particularly advantageous if, according to one configuration of the invention, the X-ray image is additionally used to determine the thickness of the sheath and/or the distance between the welded joint and the sheath and/or the thickness of the welded joint and/or the thickness of the wires, and these parameters are used for quality determination. This additionally, without further outlay, makes it possible to draw conclusions as to the stability of the sheath, the quality of the welded joint and the position of the welded joint relative to the sheath (centering etc.).

These inspections are particularly comprehensive if, according to a preferred refinement, in addition to the X-ray image perpendicular to the plane of the wires, an X-ray image is taken in a direction which is rotated through 90° and this image is used for quality determination.

BRIEF EXPLANATION OF THE FIGURES

The invention is to be explained in more detail below with reference to exemplary embodiments in conjunction with the drawing, in which:

FIG. 1 shows a cross section through a thermocouple as is to be tested by the method according to the invention, above the hot junction;

FIGS. 2–6 show longitudinal sections illustrating various steps involved in the production of a thermocouple which is to be separated out as being unsuitable by the method according to the invention;

FIGS. 7–8 show longitudinal sections illustrating various steps involved in the production of a thermocouple which is to be deemed suitable by the method according to the invention;

FIG. 9 shows an outline view of an arrangement for taking an X-ray image perpendicular to the plane of the wires of the thermocouple;

FIG. 10 shows an outline view of an arrangement for taking an X-ray image parallel to the plane of the wires of the thermocouple;

WAYS OF CARRYING OUT THE INVENTION

A suitable method for monitoring the quality of the production process is to determine the free length, which is not supported or is not sufficiently supported, of the thermocouple or the wires which, by means of their connection, form the thermocouple. The free length of the wires is marked by the boundary between the highly compacted insulation (16 in FIG. 6) and the less compacted (loose) insulation (17 in FIG. 6). To allow nondestructive testing of a sheathed thermocouple in this respect, it is possible to use X-ray images. Since X-ray images of this type do not directly show the boundary between the different regions of the insulation (16, 17), this boundary has to be determined indirectly. For this purpose, according to the invention, the position and profile of the wires 13, 14 in the vicinity of the welded joint 15 are used. If the wires 13, 14, which are clearly visible in an X-ray image and fundamentally run parallel to one another, deviate from the parallel orientation in front of the welded joint 15, for example over the last few millimeters, this is a clear indication that the wires have been exposed over this distance during production and in the finished thermocouple are surrounded by a less well compacted insulation over this distance.

Figure 11:
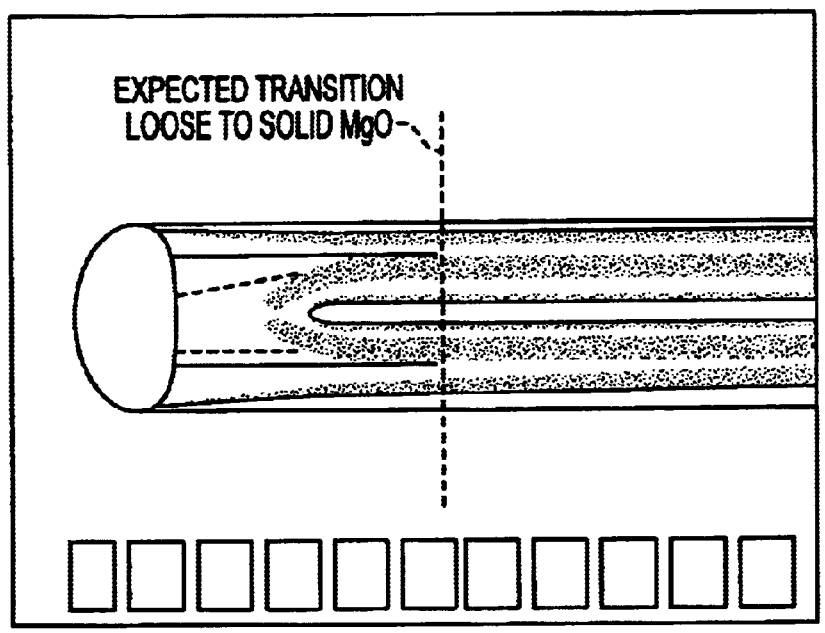
FIG. 11 shows the X-ray image of a thermocouple which has been produced as shown in FIGS. 2–6.

To establish the position and profile of the wires 13 and 14 in the vicinity of the welded joint 15, first of all, as shown in FIG. 9, an X-ray image of the thermocouple 10 or 10' is taken, the X-radiation 19 for this image being incident perpendicular to the plane in which the wires 13, 14 lie. The result, for a thermocouple produced in accordance with FIGS. 2 to 6, is an image as shown in FIG. 11. Thin horizontal (white) additional lines have been drawn into this image, indicating the profile or orientation of the two wires in the region of the welded joint. A further perpendicular (white) additional line, which is at a distance of approximately 3–4 mm from the welded joint, mark the boundary between the insulations (16, 17 FIG. 6) of different density. A thermocouple of this type is rejected as being unsuitable.

Figure 12:
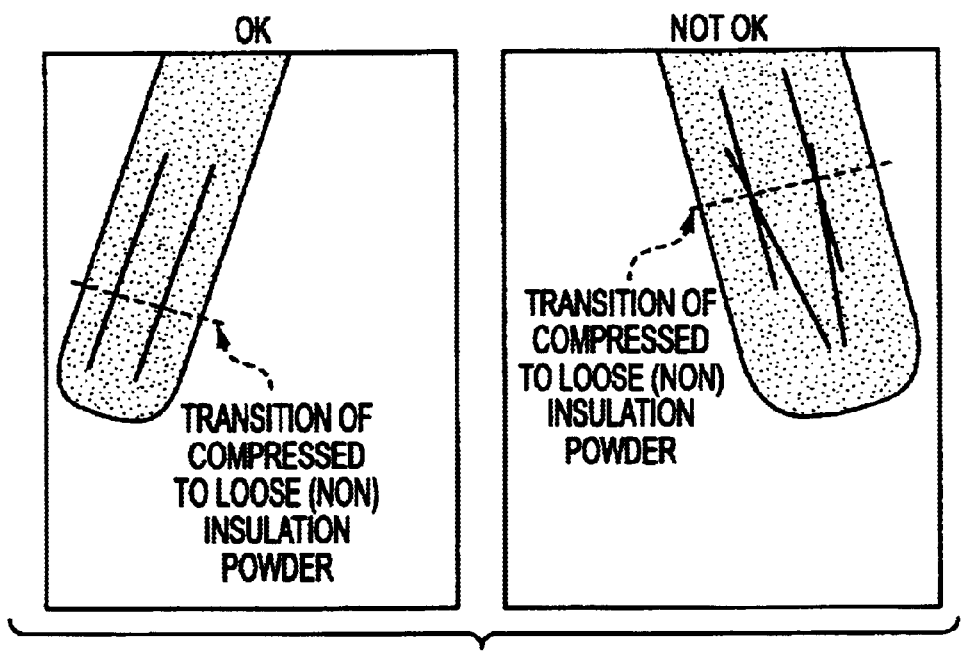
FIG. 12 compares the X-ray images for two thermocouples, of which one (left-hand image) is classified as suitable and the other (right-hand image) is classified as unsuitable.

A comparison between the corresponding X-ray images of a suitable thermocouple and an unsuitable thermocouple is shown in FIG. 12. In the left-hand X-ray image, the wires run completely parallel to one another all the way to the welded joint in accordance with the continuous (white) additional lines. The boundary between the insulation regions (dashed white additional line) runs directly below the welded joint. In the right-hand X-ray image, the wires are angled off a few millimeters below the welded joint (continuous white additional lines). The boundary between the insulation regions (dashed white additional line) accordingly runs a few millimeters below the welded joint.

In addition to the X-ray image, in which the X-radiation 19 is oriented perpendicular to the plane of the wires, in accordance with FIG. 10 it is possible to take a further X-ray image, in which the X-radiation 19 is incident at an angle which is rotated through 90° with respect to the first image. Then, for further quality assurance, the two images can additionally be used to determine and check the thickness d1 of the sheath 11 in the vicinity of the welded joint (FIG. 9), the thickness d2 or quality of the welded joint 15 (FIG. 10), the quality of the welded closure (18 in FIG. 6), the distance a or the position of the welded joint 15 relative to the sheath (FIG. 8) and the thickness d3 of the wires 13, 14 (FIG. 7).

The X-ray images may in principle be carried out manually, in which case either the thermocouple 10, 10' or the X-ray unit is rotated through 90° between the images.

However, it is equally possible for the testing to be carried out automatically using an on-line X-ray system and computer-assisted image analysis: first of all, the thermocouple or the X-ray unit is rotated until one of the orientations shown in FIGS. 9 and 10 is reached. Then, a first image is taken. After rotation through 90°, a second image is taken. The two images are then assessed using predetermined criteria (with regard to position and profile of the wires and the geometric configuration) by suitable software. Finally, the tested thermocouples are classified as usable or unusable.

Overall, the invention results in a very simple, nondestructive method for determining the quality of (commercially available) thermocouples for applications with high quality requirements.

| LIST OF REFERENCE SYMBOLS | |
| --- | --- |
| 10, 10' | Thermocouple |
| 11 | Sheath (thermocouple) |
| 12 | Interior |
| 13, 14 | Wire |
| 15 | Welded joint |
| 16, 17 | Insulation (e.g. MgO powder) |
| 18 | Closure |
| 19 | X-radiation |
| a, d | Distance |
| d1, d2, d3 | Thickness |

What is claimed is:

1. A method for the nondestructive quality testing of a thermocouple which can be used at high temperatures high levels of vibration, or both, which thermocouple comprises at least two wires which run substantially parallel to one another in one plane, the wires are connected to one another at one of their ends by a welded joint, the wires are surrounded by a hermetically sealed sheath, and inside the sheath the wires are embedded in insulation comprising a compacted powder, the method comprising:

Passing X-radiation through the thermocouple perpendicular to the plane of the wires and taking an X-ray image;

determining the position of the wires in the vicinity of the welded joint from the X-ray image; and establishing the quality of the thermocouple from the position of the wires in the vicinity of the welded joint.

2. The method as claimed in claim 1, comprising:

deeming the quality of the thermocouple acceptable if the wires run completely parallel as far as the welded joint; and deeming the quality of the thermocouple unacceptable if the wires are angled off or bent toward one another, deviating from the parallel arrangement, a few millimeters before the welded joint.

3. The method as claimed in claim 2, wherein the wires are at a predetermined first distance (d) in the parallel arrangement, and comprising:

deeming the quality of the thermocouple unacceptable if the distance between the wires in the angled-off region is reduced by more than a third of the first distance (d).

4. The method as claimed in claim 3, further comprising:

determining at least one parameter from the X-ray image selected from the group consisting of the thickness (d1) of the sheath the distance (a) between the welded joint and the sheath, the thickness (d2) of the welded joint, the thickness (d3) of the wires, and combinations thereof; and wherein establishing quality comprises establishing from said at least one parameter.

5. The method as claimed in claim 2, further comprising:

determining at least one parameter from the X-ray image selected from the group consisting of the thickness (d1) of the sheath the distance (a) between the welded joint and the sheath, thickness (d2) of the welded joints, the thickness (d3) of the wires, and combinations thereof; and wherein establishing quality comprises establishing from said at least one parameter.

6. The method as claimed in claim 1, further comprising:

determining at least one parameter from the X-ray image selected from the group consisting of the thickness (d1) of the sheath, the distance (a) between the welded joint and the sheath thickness (d2) of the welded joints the thickness (d3) of the wires, and combinations thereof; and wherein establishing quality comprises establishing from said at least one parameter.

7. The method as claimed in claim 6, further comprising taking a second X-ray image in a direction which is rotated through 9°; and wherein establishing quality comprises establishing quality from said second X-ray image.

* * * * *